United States Patent [19]

Austin

[11] Patent Number: 4,614,458
[45] Date of Patent: Sep. 30, 1986

[54] PERMANENT DREDGE SYSTEM

[76] Inventor: Stephen B. Austin, 959 Penn Cir., King of Prussia, Pa. 19406

[21] Appl. No.: 622,861

[22] Filed: Jun. 20, 1984

[51] Int. Cl.⁴ ............................................. E02B 8/02
[52] U.S. Cl. ...................................... 405/74; 405/52
[58] Field of Search ................... 405/74, 52; 210/534, 210/535, 163

[56] References Cited

U.S. PATENT DOCUMENTS

| | | |
|---|---|---|
| 552,877 | 1/1896 | Ipson . |
| 1,077,476 | 11/1913 | Kaibel ................................ 210/534 |
| 1,094,310 | 4/1914 | Deal . |
| 1,351,979 | 6/1919 | Valentin . |
| 1,388,040 | 8/1921 | Hood . |
| 1,482,216 | 4/1920 | Boosey . |
| 1,986,148 | 1/1935 | Harp . |
| 2,079,269 | 5/1937 | Williams ......................... 210/163 X |
| 2,346,787 | 4/1944 | Ramsey ........................... 210/534 X |
| 2,442,358 | 6/1948 | Harp . |
| 2,673,451 | 3/1954 | Garlel . |
| 3,013,395 | 12/1961 | Gaylord . |
| 3,161,026 | 12/1964 | Smedley . |
| 3,638,432 | 2/1972 | Schoonmaker . |
| 3,659,425 | 5/1972 | DeGeeter . |
| 3,772,894 | 11/1973 | Godley et al. . |
| 4,074,535 | 2/1978 | Schoonmaker .................. 405/52 X |
| 4,147,450 | 3/1979 | Schoonmaker . |
| 4,189,253 | 7/1979 | Schoonmaker . |

*Primary Examiner*—Dennis L. Taylor
*Attorney, Agent, or Firm*—Steele, Gould & Fried

[57] ABSTRACT

A permanently-installed system of intakes and conduits for removing accumulated sediment from the bottom of a watercourse includes a pattern of spaced slurry intakes of flared shape, connected by a conduit network to suction pumps. The intakes have sides sloping toward an opening at an angle at least as great as an angle at which the sediment will slide, whereby the sediment is caused to accumulate, between intermittent operations of the system, at a lowermost portion of the intake. A quantity of sediment is thereby concentrated in the flow path for removal. A cowling and anti-vortex fin structure supports a movable valve plug to permit sequential operation of individual intakes. The cowling and sloping sides, together with the anti-vortex fins cause a horizontal flow of water across the bottom to sweep sediment toward the intakes. A plurality of spaced rods protect the intakes from clogging due to entry of large pieces of debris.

16 Claims, 7 Drawing Figures

PERMANENT DREDGE SYSTEM

BACKGROUND OF THE INVENTION

1. Field of the Invention

The present invention relates to the field of dredging of sediment, and in particular to a permanently-installed dredging system in which periodically-activated suction is applied to a novel drain structure mounted at a desired depth to withdraw sediment accumulating above such depth.

2. Description of the Prior Art

Sediment removal systems in which suction conduits are mounted below a desired level of sediment have been attempted previously. U.S. patents to Schoonmaker including U.S. Pat. Nos. 3,638,432, 4,074,535 and 4,147,450 teach variations of a system in which a horizontally-oriented suction conduit is bored at spaced point along an upper side to form a series of openings into which sediment is theoretically drawn when a suction pump is actuated. The Schoonmaker devices have no particular intake structure; the horizontal tube is merely vertically bored at spaced points along its length. In order to prevent problems of clogging or jamming due to sediment accumulation over the spaced apertures, Shoonmaker provides an auxiliary water conduit fed from an input located in the water, well above the level of sediment. Auxiliary spray heads around the intake are activated when suction commences, to agitate and entrain the sediment together with water and form a slurry to be drawn in. The apertured tubes are aligned to extend transversely across a stream or the like at spaced areas. Another example of a linear system using straight conduits having intakes on atop side is shown in a patent to Gaylord, U.S. Pat. No. 3,013,395, and also employs auxiliary spray means to agitate and entrain sediment.

The prior art also has conceived of using simple depressions in a watercourse in order to accumulate sediment, thereby clarifying the water in the watercourse or retarding accumulation of sediment elsewhere. Examples of sandtraps for accumulating sediment are shown in U.S. Pat. Nos. 552,877—Ipson and 2,673,451—Gariel. In these disclosures, depressions having sloping sides are formed in the bottom of the watercourse, and the depressions terminate in a conduit. In Gariel, a plurality of baffles are provided to reduce turbulence in the water and thereby allow the sediment to settle and accumulate. In Ipson, the depression itself is apparently considered sufficient to slow the water and accumulate sediment. In Ipson, a displacable drain plug may be removed using an apparatus reaching to the surface of the water, allowing the sediment to be discharged, together with water.

The Ipson device may be characterized as a depression across the bottom of the channel which may be flushed when full. In modern use, large scale sandtraps in the form of dredged-out depressions at or adjacent navigable channels are employed to retard accumulation in the channel. These formations are based upon the fact that sediment is at least partly mobile, and will accumulate first in the area of lowest elevation. Therefore, one approach to maintaining the bottom of a watercourse below a predetermined point has been to provide a deep depression which fills up with sediment before substantial sediment can accumulate in the balance of the channel or watercourse area. The sandtrap depression must then be dredged instead of the channel, or in addition thereto.

In U.S. Pat. Nos. 1,986,148 and 2,422,358, both to C. B. Harp, a conduit system having a particular mounting structure for auxiliary pressure nozzles is disclosed. As in Schoonmaker, the object of the nozzles is to agitate and entrain sediment around the intake head in order to allow a flow of a slurry of sediment and water. In Harp, the nozzles are positioned in a protected enclosure, namely under a conical hat carried by spaced supports attached to a conduit.

Aside from the matter of dredging, conical fittings for conduit intakes have been used for various purposes. For example, in U.S. Pat. No. 1,482,216—Boosey a conical intake having a grate thereupon leads from an external area into a drain conduit. The conical intake is provided in order to increase the cross-section exposed to flow in the area of the grate, and thereby decrease the likelihood that the grate will become clogged.

The present invention differs from such prior art use of conical intakes because rather than decrease the concentration of obstructing materials, the invention concentrates and accumulates sediment at an entry point. In so doing, the entire cross-section of water defined by the flared or conical funnel-shaped opening acts upon the localized sediment accumulating at the narrowest part of the intake, forcing the sediment to flow into the conduit system, Moreover, the invention forms a horizontal flow of water around the intake to draw peripheral accumulation into the intake. The intake and drain action is also driven by a discharge side of the suction pump which is preferably mounted at the same elevation as the intake, such that the fluid head over the accumulated sediment offsets the output head on the suction pump in lifting and discharging the fluid and entrained sediment.

Unlike prior art sandtraps, the invention comprises a plurality of intakes that are spaced in two or even three dimensions to define a desired depth for the bottom of the watercourse in that area. Each intake is quite broad, and just steep enough that any sediment falling on the intake slides down the sloping intake walls to accumulate immediately adjacent the intake opening. The intake walls are thereby kept as horizontal as practicable, and help define a horizontal direction of flow into the intake. The horizontal flow entrains sediment surrounding the intake, bringing the depth surrounding the intake to a level closer to that of the intake. Accordingly, occasional operation of the suction pump is all that is necessary to clear the intake of sand and/or any accumulated sediment and also to remove peripheral accumulations. No auxiliary agitators are required. The invention accomplishes this while minimizing the need for suction pump capacity, because the conduit system is valved at the intakes such that pump capacity is controllably concentrated on individual intakes or sets of individual intakes.

SUMMARY OF THE INVENTION

It is an object of the invention to provide an inexpensive and effective permanent dredging system in which a minimum of intakes service a wide area; which may be intermittently operated but which is not subject to clogging with sediment; and, wherein the flow of water is all that is necessary to flush accumulated sediment from the intake area.

It is also an object of the invention to minimize the necessary pump volume capacity and pressure capacity needed to achieve a sediment-entraining flow rate necessary to operate an effective permanently-installed dredging system.

It is another object of the invention to accumulate and make use of sediment without interfering with watercourse traffic and without need for large and expensive sandtraps.

It is still another object of the invention to maximize the effectiveness and minimize cost of dredging watercourses subject to accumulation of sediment.

These and other objects are accomplished by a permanently-installed, suction-driven intake and conduit system for removing accumulated sediment from the bottom of a watercourse including a pattern of spaced slurry intakes of wide flaring, square or conical funnel shape, connected by a conduit network to at least one suction pump. The intakes have sides sloping inwardly to an aperture at an angle at least as great as an angle at which the sediment will slide, whereby sediment settling on the sides is moved to a restricted lowermost portion for removal without special apparatus to agitate the sediment or unclog the intakes. An anti-vortex cowling and fin structure supporting a movable valve plug enables each intake to be opened separately, and also directs water horizontally over sediments surrounding the intake, entraining or leveling them as well. Spaced vertical bars may be provided to protect the intake from large pieces or debris or other material.

BRIEF DESCRIPTION OF THE DRAWINGS

There is shown in the drawings the embodiments which are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
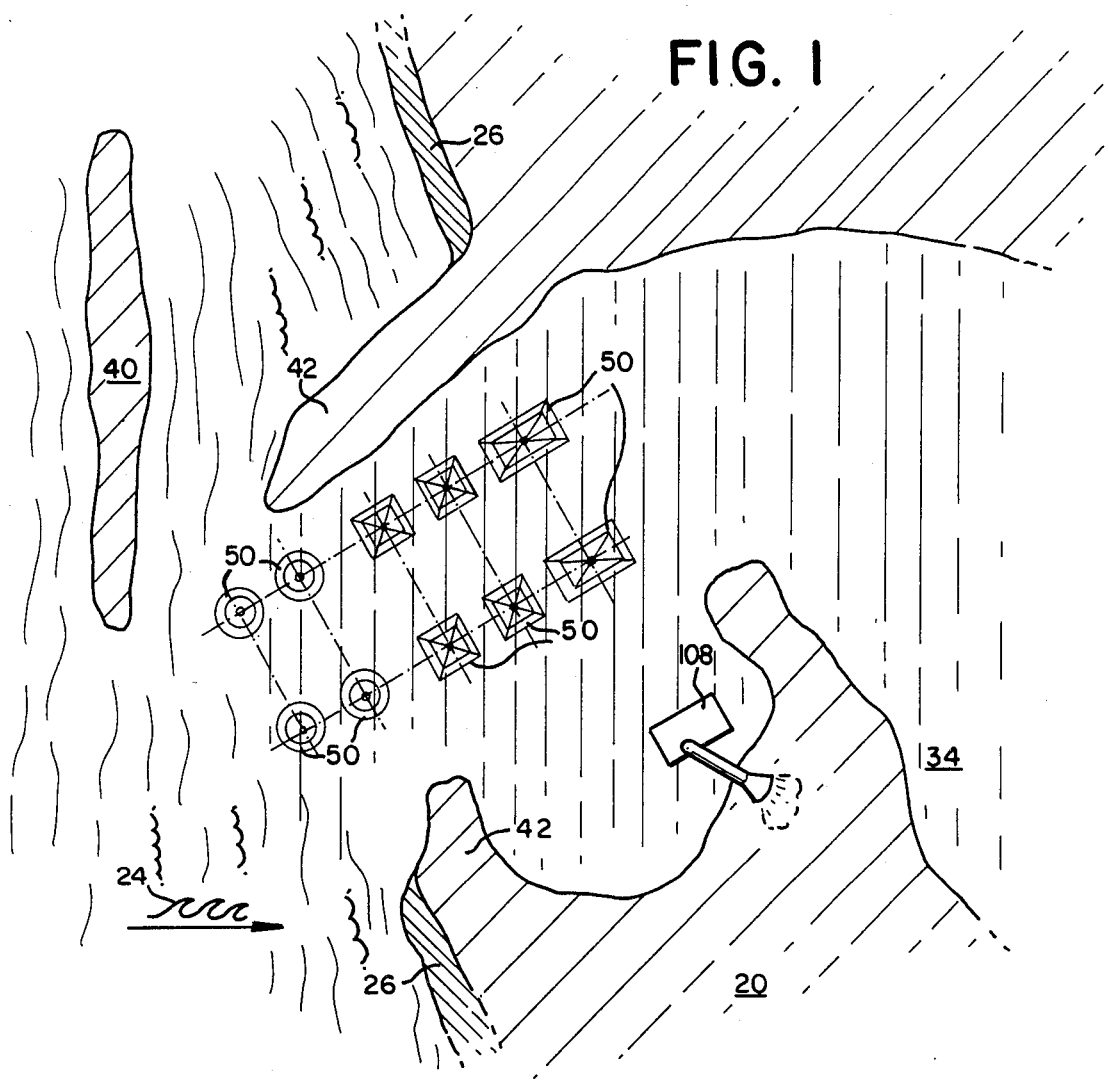
FIG. 1 is a plan view of an example harbor installation according to a preferred embodiment of the invention.
Figure 6:
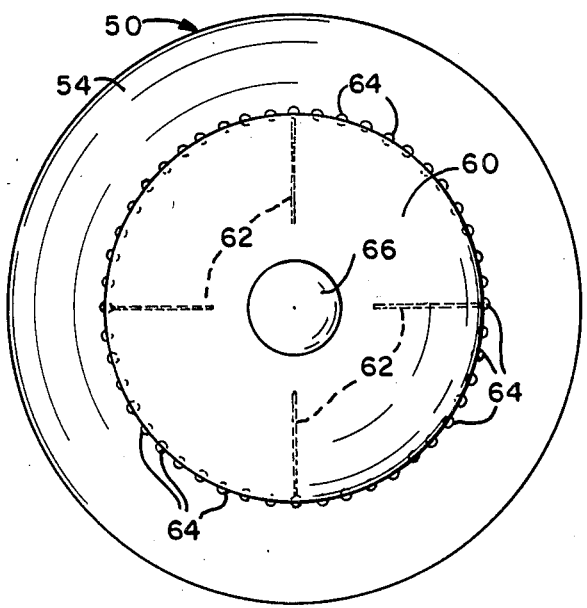
FIG. 6 is a plan view of an intake.
Figure 7:
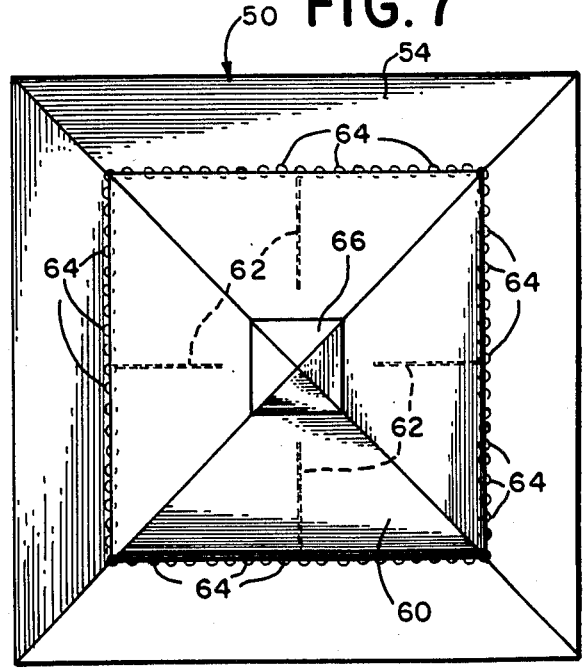
FIG. 7 is a plan view of another intake.

A simplified harbor having a permanent dredge system is shown in plan view in FIG. 1. In inner harbor area 34 may be protected, for example, by peninsulas extending from land mass 20. Adjacent a main passageway by which vessels access the inner harbor 34, a series of jetties and breakwaters are provided. The purpose of the breakwaters, for example, detached breakwater 40 and extending peninsular jetties 42, is to protect inner harbor 34 from the action of waves 24. Waves 24 vary in angle of approach, but generally break more or less parallel to the line of the shore or beach 26. The action of the waves 24 against land 20 gradually breaks down rock and other component materials of land 20, forming sediment in the form of particles of dirt and sand which accumulate adjacent to the shore line, on the beach and in the water.

The sediment is suspended more-or-less evenly through the water and settles over all the bottom. However, the sediment also flows and shifts gradually due to water currents in the same manner as snow drifts and sand dunes form and move on dry land. The sediments would gradually close the main passage between jetties 42, and must be removed. In order to maintain passageways between the protective structures including breakwater 40 and jetties 42, the accumulations on the bottom of the passages are dredged. Unlike conventional methods in which a vessel-carried suction pump is connected to a suction head which is immersed and moved over and through sediment on the bottom, the invention comprises a permanently-installed system of intakes 50. Intakes 50 are characterized by wide shallow intake structures in the form of square or round sloping or flared funnels, dispersed over the area of the desired channel, and mounted at an elevation at least as low as the desired bottom of the watercourse at that area. By periodically operating a suction pump connected to the intakes, sediment accumulated on and around an intake since the previous operation is withdrawn and the vessel passageways remain open. Clogging of intakes is prevented by the particular structure, and a horizontal, sediment-sweeping flow is achieved.

The sediment withdrawn from the intakes 50 may be used for beach-replenishment, to enlarge and strengthen jetties 42 or breakwater 40, or may simply be discharged into the ocean downstream with reference to the prevailing current. It is preferred that the sediment be put to good use, such as for enlarging land surfaces. In some areas, the volume of sediment is simply too great to allow indefinite additions to land masses. Certain harbors on the west coast of the United States fall into this category. On the east coast of the United States, however, many beach areas are characterized by an insufficient accumulation of sand to protect developed land areas from wave action during stormy weather. Even if the incidence of sediment is low and watercourses typically remain open at adequate depth, a system according to the invention can be employed to regularly extract offshore sediment and discharge the same to enlarge beaches or to form protective dunes and the like.

Figure 2:
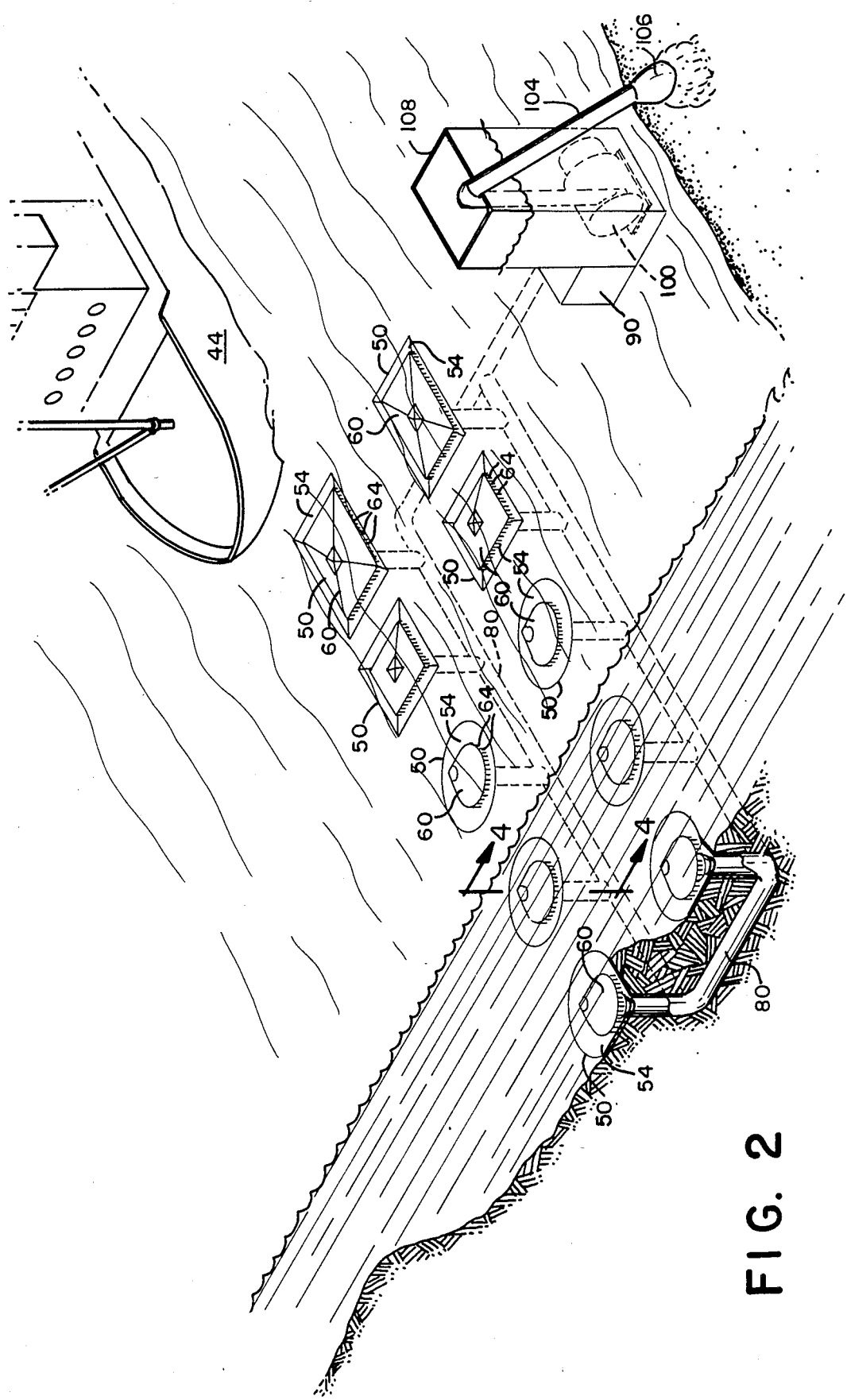
FIG. 2 is a perspective cut-away view thereof.

FIG. 2 is a cut-away perspective view showing the installation of permanent dredge intakes according to the invention. A two or three dimensional pattern of intakes 50 is dispersed over a desired contour, low enough to allow free passage of vessels 44. In passing, vessels may cause turbulence and disturb sediments, prevailing current may disturb sediments, and over time, sediments will settle out of suspension in the water. According to the invention, the sediments falling on an enlarged area are accessible to the intake by means of water flow. Sediments falling directly on the intake or sliding onto the edges thereof are caused to slide toward the valved input apertures of the intake heads, precluding clogging.

Figure 3:
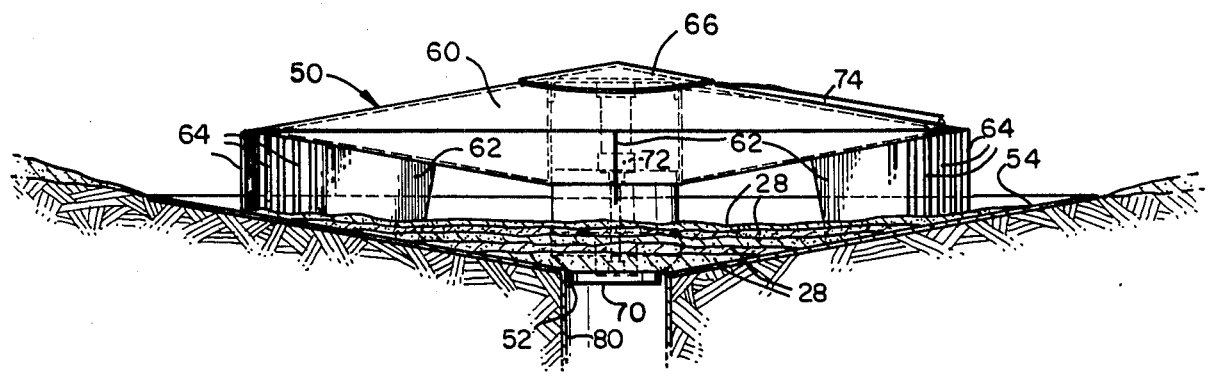
FIG. 3 is a partial section view of an embodiment of the invention taken along lines 4—4 in FIG. 2, shown closed.

Referring to FIG. 3, the intake heads 50 are characterized by sloping walls 54 in the general shape of a shallow square, round, sloping wall or flared funnel converging to an opening 52 and connected to a central conduit 80. All the intakes 50 are connected in fluid communication with one or more suction pumps 100, which draws accumulated sediment and water into any intake which is open when the pumps are on, thereby removing the sediment from the intake and the area thereof.

Referring again to FIG. 2, suction pump 100 is mounted, for example in pump house 108, at approximately the same elevation as the desired bottom contour, that is, at approximately the same elevation as the intakes 50. In this manner, the water above the intake provides a fluid head which stands on the intake of the suction pump or pumps. The suction pump 100 preferably discharges on dry land. Accordingly, suction pump 100 must overcome a fluid head on the discharge side that substantially balances the input fluid head. The discharge conduit 104 may have vertical and horizontal legs as shown in FIG. 2, or the entrained sediment and water can be pumped up an inclined conduit.

Figure 4:
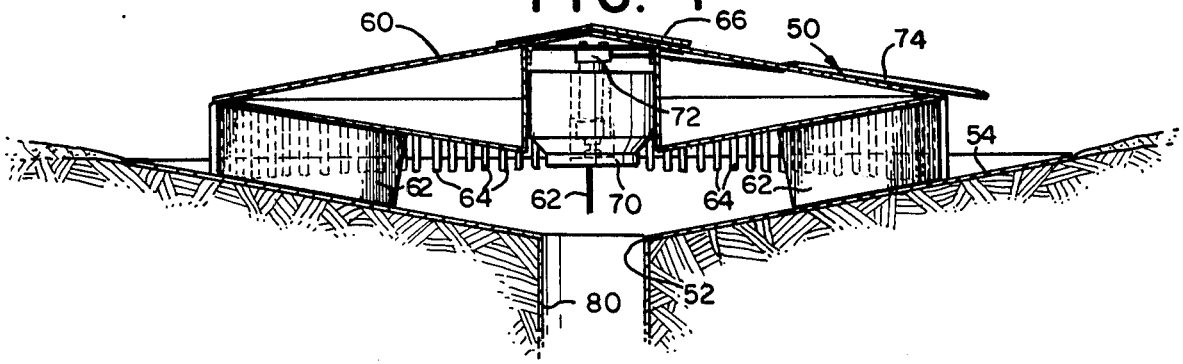
FIG. 4 is a full section of embodiment of FIG. 3, shown open.

Details of the intake head are best shown in FIGS. 3 and 4. In FIG. 3, a cross-section of intake head 50 is shown, the covering body 60 being shown from the outside and the valve being closed. Sloping walls 54 are specifically designed to define a slope at least as great as a maximum angle of repose which will be assumed by the sediment material, for example, ocean sand. In other words, sloping walls 54 are designed to slightly exceed the angle of slide of the sediment material, whereby any sediment which falls directly on intake 50 will move to the intake aperture, and will be discharged through the suction pump when the same is operated and the intake valve opened.

Adjacent areas surrounding the intake accumulate sediment between operations as well, whereby mounds of accumulation at a lesser angle build up, some of the accumulation sliding onto intake 50. In any event, accumulations on intake 50 as well as around intake 50 are swept into the intake when the pump is activated. For ocean sand, the typical angle of slide is quite low. Depending on the character of the sand, the required angle may be as little as a few degrees. The precise angle may be determined by experimentation, i.e., by observing the angle at which the sediment dependably slides. This angle will be slightly greater than the characteristic maximum angle of repose, i.e., the angle which the sediment material assumes when piled in a mound.

Intake head 50 comprises a valve plug 70 which is axially movable between a withdrawn position where the valve plug 70 is raised into the covering structure 60, and an advanced position at which the plug 70 seats sealing against opening 52 in sloping-wall intake 50. The central cover or cowl body 60 is shaped like a pair of facing saucers or low cones attached back to back. The downward-directed cone has a central opening for receiving the valve plug. The downwardly-directed cone portion, together with sloping walls 54, defines a nearly-horizontal flowpath inward toward opening 52. The horizontal inward flow is also confined by anti-vortex slats 62. The slats 62 and cover cowl 60 cause water to enter from the periphery of the intake and move radially (for a round conical intake) toward conduit opening 52. The downwardly-directed wall of cowl body 60 is parallel to walls 54, defining an input flowpath of constant height. A plurality of protective bars 64 keep any large refuse from fouling the valve. The slats also decrease the occurrence of vortices which cause uneven flow and could result in uneven or incomplete removal of sediment. A hydraulic cylinder 72, connected to a control by means of a hydraulic fluid line 74, drives the valve plug up and down.

FIG. 3 shows the progressive accumulation of layers of sediment 28. As noted hereinabove, the side walls 54 exceed the characteristic angle of slide of the sediment. Therefore, sediment material 28 that initially falls on walls 54 accumulates in the lowermost part of the intake, regardless of where on the intake walls 54 the sediment initially falls. Some of the sediment from the periphery will slide down the peripheral buildup onto the walls 54. Accordingly, all the sediment of a relatively large area becomes confined around valve body 70 in the area of the aperture 52. When the valve body 70 is withdrawn from aperture 52, shown in FIG. 4, the sediment again begins to slide and can be removed without the need for a pump capacity sufficient to immediately intake standing but not-yet-entrained sediment. There is therefore no need for auxiliary sediment agitating and entraining apparatus or the like to initiate a flow. Furthermore, anti-vortex slats 62 as well as the passage, defined between walls 54 and body 60 cause a substantially horizontal inward flow, whereby sediment at and around the intake is sucked away.

Both the external walls 54 of intakes 50, and also the upper surface of central cover body 60, are sloped such that the sediment will not remain in position on such surfaces. Opening the valve plug and operating the pump therefore applies all the water pressure of the water standing over the area of the intake to move the confined sediment through the output conduit 80. As shown in FIG. 4, opening the intake allows the sediment at and around the intake to be merely flushed away by the large volume of passing water moving inwardly toward opening 52.

The funnel-shaped intakes are only slightly steeper (e.g., up to 15° steeper) than the characteristic angle of slide of the sediment. Therefore, a thick column of sediment which is the result of steep walls, and which might clog an intake, does not build up over the intake aperture. The sediment slowly slides down and builds up, becoming both deeper and wider gradually. The optimum frequency of pump operation will activate each intake when the accumulation approaches the lowest point of body 60.

Accumulated sediment adjacent the intake head, but not lying directly on the intake head, will assume an angle of repose (i.e., a mounding angle) typical of the type of sediment. Therefore, areas of relatively higher elevation will be left in uneven mounds between the intakes. The passage of boats, currents, tides and the like will also affect the occurrence of such irregularities. The intakes are made wide enough, and are closely spaced enough, that sediment mounding between the outer edges of the intakes at the characteristic angle of repose will not pile above the desired depth of the bottom. Allowing for such mounds, the intakes must be mounted at least at low as the desired contour, and may be made lower as required due to the spacing of the intakes, and the character of the sediments. Of course operation of an intake draws in sediment surrounding the intake, and flattens any mounding within a certain range.

The individual intake heads 50 may be round, square, rectangular or as otherwise needed. As shown in FIG. 1, an array of intakes can include various shapes. The intakes are connected to one another and to suction pump 100 by means of a conduit network 80. Conduit network 80 need not have any valves or the like, because the intakes themselves each are provided with a movable axial plug, namely valve body 70. The individual valving allows one or more intakes to be selectively opened. In this manner, the suction pumps need be provided only in capacity adequate for the open intakes, that is less than all the intakes, and a lower current and suction capacity is needed to operate adequately. Therefore, the system can be operated at a relatively low expense, as compared to many other dredging operations.

Figure 5:
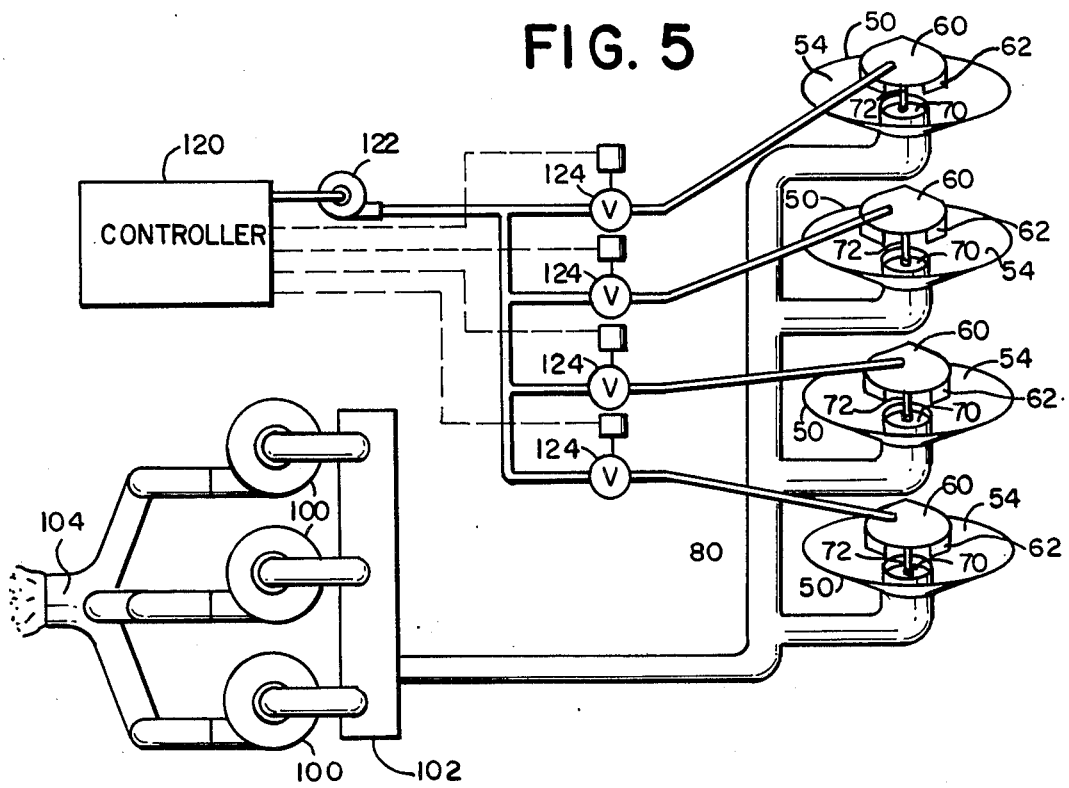
FIG. 5 is a schematic view of the interconnection of components according to the invention.

The overall system is shown schematically in FIG. 5. A controller 120 is connected to operate a hydraulic pump 122 for powering the hydraulic cylinders 72 in each of the intakes 50, and also for operating the suction pumps 100. Suction pumps 100 may be provided in a plural parallel array, using a connecting manifold 102 or a flow balancing device as needed. Alternatively, single or grouped suction pumps may be devoted to groups of intakes, such that activation of one pump applies suction to a subset of the intakes.

The controller may be connected to a means for automatically sensing the rate or extent of sediment accumulation, for example, by means of sensors placed in one or more intakes 50 and used to sense when the sediment has accumulated to the level thereof. Alternatively, activation via controller 120 may be based upon the passage of time, and/or by accumulation of sediments. The system can also be controlled manually.

The controller periodically powers the hydraulic pump 122, opens the appropriate valve mechanism 124, and thereby hydraulically lifts open the valve plug 70 at the selected input or group of inputs. The valve plug is preferably a cylinder as shown in FIGS. 3 and 4, high enough to entirely block the space between cover 60 and sloping wall 54 when the valve is closed. The valve plug is withdrawn completely into body 60 when the valve is opened. Thus valve plug 70 need not force sediment clear of aperture 52. The movement of the valve plug will open a route for flow, and the sediment will immediately begin to slide downward toward the input aperture.

The controller, either simultaneously with valve opening or after a short delay, commences operation of the suction pump, drawing a mixture of water and accumulated sediment through the input aperture. A slurry of water and sediment forms when the flow reaches a certain rate, for example about 10-20 feet per second. The flow may be passed through a further debris trap 90, and then through the suction pump. The material is then discharged as an entrained sediment slurry at the end of a discharge conduit 104. The discharge conduit can be provided with a movable fitting 106 whereby the output stream can be directed to leave the accumulated sediment where desired, for example, to build up beaches, enlarge breakwaters or the like.

The permanent dredging system according to the invention is effective in that accumulated sediment is removed using a minimum of pump capacity, no disruption of traffic following installation, and virtually no maintenance outside of the pumps 100 and trap 90. Although the frequency and period of operation will depend upon the rate of accumulation of sediments, even sediment-prone western harbors will be adequately serviced by occasional operation of the suction pump. The cost of installation and operation nevertheless compares favorably with expensive and disruptive vessel-mounted movable-intake dredging operations which would otherwise be needed to remove sediment. It must be kept in mind that less-frequent operations such as vessel-mounted dredging systems must remove a much larger amount of sediment material, possibly also including the formation of additional depressions adjacent the area of interest to function as sandtraps. The present invention allows the bottom to be much more precisely and dependably maintained at the desired contour using less fluid handling capacity and without disruption or complex machinery.

The various conduits and intake structures and preferably made of corrosion-resistant material. The funnel-shaped input structures, and connecting conduits 52 are preferably made of steel having a smooth, low-friction coating to minimize corrosion. The movable portions including the valve plug 70, and a support structure therefore, may be placed in the opening 52 of each intake in the form of a separate, removable valve, seat and cover structure. An access cover 66 may be provided to assist in installation and service of the hydraulic cylinder and valve.

The invention has been described with reference to salt water harbors, and accumulating ocean sand. It will be appreciated that the invention is likewise applicable to accumulations of more muddy sediments in rivers and lakes, and especially to the maintenance of channels and simultaneous buildup of protective levies along river banks.

The invention having been disclosed, a number of additional variations will now become apparent to persons skilled in this art. Reference should be made to the appended claims rather than the foregoing specification as indicating the true scope of the invention.

What is claimed is:

1. A permanent dredging system for maintaining a desired bottom contour across an area of a watercourse by intermittent removal of accumulating sediment, the accumulating sediment defining an accumulation contour higher than the desired contour, the system comprising:

a plurality of spaced slurry intakes mounted in a matrix pattern at least as low as said bottom depth, the intakes being spaced at least in two dimensions such that the plurality of intakes remove sediment from an area having a substantial length and width, and each of said intakes being an upwardly-directed funnel having sides sloping inward at an angle at least as great as an angle at which said sediment will slide, the funnel having a central flow opening;

a conduit network in fluid communication with the openings of the slurry intakes; and, a suction pump connected to the conduit network, operable to draw fluid and sediment into the intakes, whereby operation of the suction pump removes materials at and between the intakes, approaching the desired bottom contour.

2. The system of claim 1, wherein each of the slurry intakes includes a cowl body over the central flow opening thereof, the cowl body being wider than the opening and narrower than the funnel, the cowl body being spaced from the funnel by a plurality of supporting fins, a downwardly-directed portion of the cowl body being substantially parallel to said sloping sides, the space between the cowl body and the funnel defining a limited access to the central flow opening.

3. The system of claim 2, wherein the supporting fins are radially directed with respect to the central flow opening, whereby the cowl body and fins define a substantially-horizontal vortex-free flowpath.

4. The system of claim 2, further comprising a plurality of protective bars connecting the cowl body and sloping sides.

5. The system of claim 2, further comprising a movable valve plug operable in a first position to seal the flow opening and movable to a second position at least partly clear of the flow opening.

6. The system of claim 5, further comprising hydraulic drive means operable to move the valve plug between said first and second positions.

7. A permanent dredging system for maintaining a desired bottom contour across an area of a watercourse by intermittent removal of accumulating sediment, the accumulating sediment defining an accumulation contour higher than the desired contour, the system comprising:

a plurality of spaced slurry intakes mounted in a matrix pattern at least as low as said bottom depth, the intakes being spaced at least in two dimensions, and each of said intakes being an upwardly-directed funnel having sides sloping inward at an angle at least as great as an angle at which said sediment will slide, the funnel having a central flow opening;

a conduit network in fluid communication with the openings of the slurry intakes;

a suction pump connected to the conduit network, operable to draw fluid and sediment into the intakes; and, a controller operable to sequentially open at least one of the plurality of fluid intakes for a predetermined interval, and thereafter to close at least one of the plurality of intakes, and open at least one other of said plurality of intakes.

8. The system of claim 1, wherein the funnel has an outer span of at least 20–40 feet (6.1–12.2 meters).

9. The system of claim 8, wherein the funnel has an outer span of about 30 feet (9.1 meters) and said central flow opening is about 3–6 feet (0.9–1.8 meters).

10. The system of claim 1, further comprising means for discharging the fluid and sediment into a recovery area.

11. The system of claim 1, wherein the suction pump is installed below a surface of said watercourse, at substantially equal elevation with the fluid intakes.

12. A method for clearing sediment from a bottom of a watercourse, comprising the steps of:

installing a network of upwardly-directed funnel-shaped intakes at least as low as a desired depth of a bottom of the watercourse, the intakes being connectable in fluid communication with a suction pump, the intakes being spaced in at least two dimensions and having structure defining an at least partly horizontal flowpath, the structure including a funnel shaped upper wall of the intake and a conical cowling having a lower wall parallel to and spaced above said upper wall of the intake; and, periodically connecting at least one intake to the suction pump and operating the suction pump to draw water and sediment into said intake, whereby the sediment is cleared at and around said at least one intake, above said desired depth.

13. The method of claim 12, wherein said intakes are connected to the suction pump by withdrawing plugs obstructing the intakes.

14. The method of claim 13, wherein said plugs are hydraulically driven between open and closed positions.

15. The method of claim 12, wherein sides of said funnel-shaped intakes are at least as steep as an angle of slide of said sediment, and further comprising the step of accumulating sediment at a lower most portion of the intakes between periodic operations of the pump.

16. The method of claim 12, further comprising discharging the suction pump over the sediment-recovery area.

* * * * *